United States Patent [19]

Aloy

[11] Patent Number: 5,538,058
[45] Date of Patent: Jul. 23, 1996

[54] SEALING DEVICE

[76] Inventor: Jorge N. Aloy, ES-08960 Sant Just Desvern, Barcelona, Spain

[21] Appl. No.: 209,474

[22] Filed: Mar. 14, 1994

[30] Foreign Application Priority Data

Mar. 15, 1993 [ES] Spain ..................... 9300666

[51] Int. Cl.$^6$ .................................. B60C 19/04
[52] U.S. Cl. ...................... 152/381.5; 152/514
[58] Field of Search ................ 152/381.4, 381.5, 152/381.6, 513, 514, DIG. 9, DIG. 16

[56] References Cited

U.S. PATENT DOCUMENTS

| 1,693,909 | 12/1928 | Michelin ................. 152/381.5 |
| 4,930,558 | 6/1990 | Sahagian ................... 152/513 |

FOREIGN PATENT DOCUMENTS

| 0195278 | 1/1958 | Austria ..................... 152/514 |
| 1150207 | 1/1958 | France ....................... 152/513 |
| 1002210 | 2/1957 | Germany ..................... 152/513 |
| 8600785 | 10/1986 | Spain . | |
| 0339518 | 8/1959 | Switzerland ................. 152/513 |

*Primary Examiner*—Russell D. Stormer
*Attorney, Agent, or Firm*—Henderson & Sturm

[57] ABSTRACT

A wheel assembly includes a rim having lateral sides separated by a predetermined distance, a first flange extending inwardly a predetermined length from each of the lateral sides, a second flange spaced from the first flange and extending inwardly a longer predetermined length than the predetermined length of the first flange, wherein the first flange and the second flange define a nest, and flutings having a cross-section traversing at least a portion of the distance between the lateral sides adjacent the second flange; and a sealing device including a piece of elastic material fitted over the channel in the nest. The piece of elastic material includes a first face surface and a second face surface, wherein the first face surface includes a length shorter than a length of the second face surface, and wherein the first face surface and the second face surface are joined to opposite side surfaces. The nest includes an open area defined by the first flange having an upper surface. The cross-section of the channel have a dove-tailed shape. A tire, mounted on the previously described rim, includes a bead having side surfaces fitted against the lateral sides of the rim, wherein the bead includes protuberances extending inwardly over at least a portion of the first face surface of the piece of elastic material, and presses against the piece of elastic material; the bead is partially seated on a first seat formed by the first flange, and the piece of elastic material is at least partially seated on a second seat formed by the second flange.

18 Claims, 1 Drawing Sheet

SEALING DEVICE

TECHNICAL FIELD

The present invention relates to sealing devices.

More particularly, the present invention relates to sealing devices for tubeless tires, such as those mounted on radial spoke wheels.

Specifically, the present invention is directed to a rim, rubber or elastic sealing element, and tire assembly or unit to allow tube removal from tires, or the use of tubeless tires on radial spoke wheels, for example used on cycles, such as bicycles, motorcycles and the like.

BACKGROUND ART

Spanish Utility Model No. 8600785 of the same applicant describes a known sealing device that includes an improved rim profile by which tubeless tires can be fitted in motorcycle wheels provided with spokes. This is achieved by providing external peripheral fluting located at the profile center which define edges that have an elastic belt sealingly fitted thereon. Communication to the exterior of the tire of wheel via the sealing device is sealed through the spoke tensioning nut heads.

Although the sealing device disclosed in prior Spanish Utility Model No. 8600785 attempts to overcome the problems associated with bicycle tubeless tires or wheels, the disadvantages of such sealing devices are that, to be operative, either perfectly finished rims or types of rims obtained by welding the ends to close the ring had to be used. Otherwise, air leakage tended to occur.

DISCLOSURE OF THE INVENTION

The present invention is directed to a sealing device for tubeless radial spoke wheels of the type where the rim is provided with a groove, or channel, also referred to herein as fluting, to receive a rubber band, characterized in that the fluting is substantially "dovetailed" in shape and is substantially fully stuffed or filled with the rubber band in a way forming a substantially level and smooth top plane with interior projections internally projected from the rim and making up the seat for the beads of the tire, wherein the beads are oversized such as they partially bear upon the top side of the ends of the rubber band thus causing while the tire is inflated, a pressure of the oversized beads upon the rubber band, thereby providing a complete tire sealing regardless of any flaws, recesses or openings which the rim might have.

Briefly stated, with the sealing device of the present invention, disadvantages caused by an ill-finished rim, such as its internal roughness, are fully overcome. Also, the sealing effected by the sealing device of the present invention allows use of cost-effective rims, such as those which are end-joined with dovetailed members, for example rims that have been manufactured without any welding.

The sealing device of the present invention is advantageous because a substantially perfect or complete seal is effected at the start of air supply. Also, the sealing device of the present invention allows the tire to be inflated with a conventional air pump, which is not possible with the prior system.

The advantageous sealing obtained with the sealing device of the present invention is characterized by the fact that the sealing between the tire and the rigidly finished rim structure is made by contact of the elastomeric material of the sealing device of the present invention, and the elastomeric material of the tubeless tire, i.e., rubber against rubber contact, without requiring any other material to effect the sealing.

Although the sealing device of the present invention has primarily been designed for bicycle tires and wheels, the sealing device of the present invention is also applicable with the same or similar efficiency to any other tires designed to be tubeless, particularly those having air leakage problems.

BRIEF DESCRIPTION OF THE DRAWINGS

To arrive at a more detailed description of the invention, reference will be made to the attached figure showing a preferred embodiment, only by way of a non-limiting and non-exhaustive example.

The figure is a profile view of a cross section of a tire, sealing device and rim assembly including the sealing device of the present invention.

DETAILED DESCRIPTION

Figure 1:
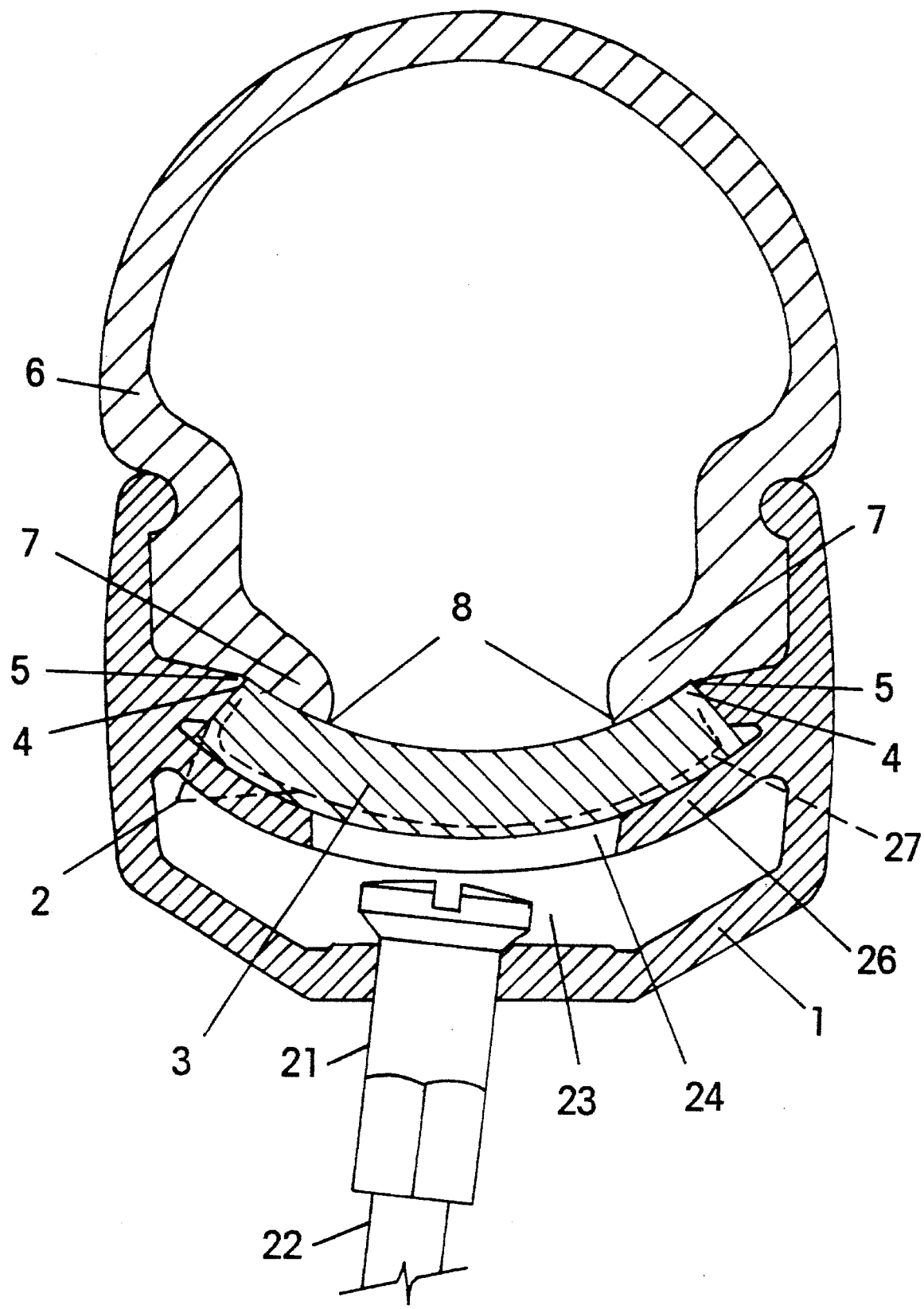

The following is a description of what is intended to be claimed as the present invention:

In one embodiment, the present invention is directed to a wheel assembly that includes a) a rim including: i) lateral sides separated by a predetermined distance, ii) a first flange extending inwardly a predetermined length from each of the lateral sides, iii) a second flange spaced from the first flange and extending inwardly a longer predetermined length than the predetermined length of said first flange, wherein the first flange and the second flange define a nest; and iv) a groove or flutings traversing at least a portion of the distance between the lateral sides adjacent second flange; and b) a sealing device including a piece of elastic material fitted over the transverse cross-section of the channel in the nest.

For purposes of the present invention, the piece of elastic material includes a first face surface and a second face surface, wherein the first face surface includes a length shorter than a length of the second face surface, and wherein the first face surface and the second face surface are joined to opposite side surfaces. The nest includes an open area defined by the first flange having an upper surface. The transverse cross-section of the grooves or fluting have a dove-tailed shape.

In another embodiment, the present invention is directed to a wheel assembly, as previously described, wherein a tire is mounted on the rim. The tire includes a bead having side surfaces fitted against the lateral sides of the rim, wherein the bead includes protuberances extending inwardly over at least a portion of the first face surface of the piece of elastic material, and press against the piece of elastic material. The first flange makes up a first seat and the second flange makes up a second seat, so that the bead is partially seated on the first seat, and the piece of elastic material is at least partially seated on the second seat. Preferably, the first face surface and the upper surface of the open area are substantially flush, and the piece of elastic material is fitted in the nest in a sealing position. Preferably, the tire comprises a tubeless tire.

In another embodiment, the present invention is directed to a tire assembly including a) a rim having i) lateral sides separated by a predetermined distance, ii) a first flange extending inwardly a predetermined length from each of the lateral sides, iii) a second flange spaced from the first flange and extending inwardly a longer predetermined length than the predetermined length of the first flange, wherein first flange and the second flange define a nest, and iv) a groove or flutings having a transverse cross-section traversing at least a portion of the distance between the lateral sides adjacent the second flange; b) a sealing device including a piece of elastic material fitted over the transverse cross-section of the channel in the nest; and c) a tire mounted on the rim, wherein the tire includes a bead having i) side surfaces fitted against the lateral sides of the rim, and ii) protuberances extending inwardly over and pressing against at least a portion of a surface of the piece of elastic material, whereby the piece of elastic material is fitted in the nest in a sealing position, and wherein the transverse cross-section of the channel have a dove-tailed shape and the piece of elastic material has a shape complementary to the dove-tail shape.

In another embodiment, the present invention is directed to a sealing device including a piece of elastic material having a substantially arcuate cross-section, and having a first face surface and a second face surface, wherein the first face surface has a length shorter than a length of the second face surface, and the piece of elastic material has a shape adapted to mate in a complementary shape of fluting of an object having an opening to effect a sealing of the opening of the object, wherein the flutings have a dove-tailed shape, the opening includes an exterior surface, and wherein the first face surface of the piece of elastic material and the exterior surface of the opening are substantially flush.

The present invention will now be described by reference to the drawing. The Figure shows a rim 1 provided with a groove or flutings having a transverse cross-section flutings 2, preferably "dovetailed", wherein a band or insert of elastomeric material or rubber band 3 is housed. The top ends 4 of the rubber band 3 are substantially level relative to the upper portion of internal projections 5 of the rim 1.

The internal projections or seat 5 of the rim 1 make up the seat for beads 7 that provide shape to the lower ends of a tubeless tire 6. The beads 7 are oversized in a way that the sealing of the tire 6 is caused and produced by the pressure of the lower hump or protuberance 8, i.e., interior protuberance, of the oversized bead 7 in a sealing position upon the ends 4 of the rubber band 3 incorporated into the groove or flutings or fluting 2 of the rim 1.

The band 3 of rubber or elastomeric material is preferably composed of rubber selected from the group consisting of natural rubber and synthetic rubbers. Natural rubber (NR) is Cis-1, 4, polyisoprene. Synthetic rubbers suitable for purposes of the band 3 of the sealing device of the present invention comprise elastomeric materials and preferably elastomeric materials selected from the group consisting of isoprene rubber (IR), butadiene rubber (BR), chloroprene rubber (CR), isobutylene-isoprene rubber (IIR), nitrile-butadiene rubber (NBR), styrene-butadiene rubber (SBR), ethylene-propylene copolymers (EPM), and ethylene-propylene-diene terpolymers.

The rim 1 may be manufactured using conventional materials commonly used in fabricating wheels. Such conventional materials may be selected from a group of wheel fabricating materials consisting of metal, metal alloys, and composite materials. Metals and metal alloys suitable for purposes of fabricating such wheels include metals selected from the group consisting of aluminum, magnesium, titanium, and steel. Composite materials which may be used as wheel fabricating materials include members selected from the group consisting of reinforced plastic, cermets, and filled composites. Reinforced plastics comprise fibers selected from the group consisting of glass fibers, and fibers of boron, carbon, aluminum silicate, and silicon carbide, and a thermo-setting resin. Particularly preferred composites are high performance composites wherein the fibers are selected from the group consisting of S-glass fibers, boron fibers, carbon fibers and aramid fibers and the matrix material is a plastic, such as polyester, but is preferably selected from the group consisting of expoxy resins, polybutadiene, vinyl ester polymers, and polyamides.

In the Figure, a spoke tensioning nut 21 for spoke 22 that provides tension to rim 1 are also shown.

Air from an air source or pump (not shown) is introduced into the tubeless tire 6 mounted on rim 1 through a valve stem (also not shown). The rim 1 also comprises a hollow area or duct 23 and channel 24 extending circumferentially around the rim 1. Channel 24 is defined by flanges 26 which also at least partially support band 3.

The air pressure of the air supplied to the tubeless tire forces or presses the band 3 away from the flutings 2 and flanges 26 and against beads 7 of the tire 6 to a sufficient extent to permit air to pass into lateral troughs 27. The lateral troughs 27 are integral with rim 1 and are defined by a groove or flutings 2. The lateral troughs 27 extend below band 3 and partially along edge sides adjacent internal projections 5 and stop short of the top ends 4 of band 3.

Air pressure of air flowing through troughs 27 presses or forces top ends 4 of band 3 against interior protuberance 8 of bead 7 of tire 6 thereby resiliently moving, i.e., flexing, protuberance 8 of bead 7 to a sufficient extent to cause an airspace between top end 4 of band 3 and the internal projections 5 of the rim and interior protuberances 8 of the bead to permit air to pass from troughs 27 past interior protuberances 8 and into the interior of tire 6.

When the desired air pressure within tire 6 is achieved, the supply of air to tire 6 is stopped, and interior protuberances 8 of beads 7 of tire 6 resiliently return to a sealing position, whereby the interior protuberances 8 of beads 7 press against top end 4 of band 3 to reposition the band 3 so that its top ends 4 are substantially level or flush relative to the upper surface of internal projections 5 of rim 1, thereby preventing air from escaping or leaking from the interior of the tire 6. Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

What is claimed is:

1. A wheel assembly comprising:
   a) a rim comprising:
      i) lateral sides separated by a predetermined distance,
      ii) a first flange extending inwardly a predetermined length from each of the lateral sides,
      iii) a second flange spaced from said first flange and extending inwardly a longer predetermined length than said predetermined length of said first flange, said first flange and said second flange defining a nest; and
      iv) flutings traversing at least a portion of the distance between said lateral sides adjacent second flange; and
   b) a sealing device comprising a piece of elastic material fitted over said flutings in said nest.

2. A wheel assembly as in claim 2, wherein said nest comprises an open area defined by said first flange having an upper surface.

3. A wheel assembly as in claim 2, wherein said piece of elastic material comprises a first face surface and a second face surface, said first face surface comprising a length shorter than a length of said second face surface.

4. A wheel assembly as in claim 3, wherein said first face surface comprises a length longer than a length of said second face surface.

5. A wheel assembly as in claim 4, wherein said first flange comprises an innermost periphery extending radially inwardly, and axially outwardly towards said second flange thereby forming a dove-tailed shape to house said sealing device.

6. A wheel assembly of claim 3, further comprising:
 c) a tire mounted on said rim.

7. A wheel assembly of claim 6, wherein said tire comprises a bead comprising side surfaces fitted against said lateral sides of said rim.

8. A wheel assembly of claim 7, wherein said bead comprises protuberances extending inwardly over at least a portion of said first face surface of said piece of elastic material.

9. A wheel assembly of claim 8, wherein said protuberances of said bead press against said piece of elastic material.

10. A wheel assembly of claim 6, wherein said first flange comprises a first seat and said second flange comprises a second seat.

11. A wheel assembly of claim 10, wherein said bead is partially seated on said first seat.

12. A wheel assembly of claim 11, wherein said piece of elastic material is at least partially seated on said second seat.

13. A wheel assembly as in claim 12, wherein said first face surface and said upper surface of said open area are substantially flush.

14. A wheel assembly of claim 13, wherein said piece of elastic material is fitted in said nest in a sealing position.

15. The wheel assembly of claim 11, wherein said tire comprises a tubeless tire.

16. A tire assembly comprising:
 a) a rim comprising:
  i) lateral sides separated by a predetermined distance,
  ii) a first flange extending inwardly a predetermined length from each of the lateral sides,
  iii) a second flange spaced from said first flange and extending inwardly a longer predetermined length than said predetermined length of said first flange, said first flange and said second flange defining a nest, and
  iv) flutings traversing at least a portion of the distance between said lateral sides adjacent said second flange;
 b) a sealing device comprising a piece of elastic material fitted over said flutings in said nest; and
 c) a tire mounted on said rim.

17. A tire assembly of claim 16, wherein said tire comprises a bead comprising:
 i) side surfaces fitted against said lateral sides of said rim; and
 ii) protuberances extending inwardly over and pressing against at least a portion of a surface of said piece of elastic material, whereby said piece of elastic material is fitted .in said nest in a sealing position.

18. A tire assembly as in claim 17, wherein said first flange comprises an innermost periphery extending radially inwardly, and axially outwardly towards said second flange thereby forming a dove-tailed shape to house said piece of elastic material.

* * * * *